(12) United States Patent
Leproust et al.

(10) Patent No.: US 7,094,537 B2
(45) Date of Patent: Aug. 22, 2006

(54) MICRO ARRAYS WITH STRUCTURED AND UNSTRUCTURED PROBES

(75) Inventors: Eric M. Leproust, Campbell, CA (US); David L. Hirschberg, Menlo Park, CA (US); Glenda C. Delenstarr, Belmont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 95 days.

(21) Appl. No.: 10/136,773

(22) Filed: Apr. 30, 2002

(65) Prior Publication Data
US 2003/0203369 A1    Oct. 30, 2003

(51) Int. Cl.
  *C12Q 1/68* (2006.01)
  *C12M 1/36* (2006.01)
  *C07H 21/04* (2006.01)

(52) U.S. Cl. .............. 435/6; 435/7.1; 435/174; 435/283.1; 435/287.2; 435/288.7; 536/23.1

(58) Field of Classification Search .............. 435/6, 435/7.1, 174, 283.1, 287.2, 288.7; 536/23.1; 530/300
See application file for complete search history.

(56) References Cited

U.S. PATENT DOCUMENTS

| | | | |
|---|---|---|---|
| 5,279,937 A | | 1/1994 | Rowe |
| 5,556,748 A | * | 9/1996 | Douglas ............... 435/6 |
| 5,556,752 A | * | 9/1996 | Lockhart et al. ........ 435/6 |
| 5,599,668 A | * | 2/1997 | Stimpson et al. ........ 435/6 |
| 5,681,702 A | | 10/1997 | Collins et al. |
| 6,033,851 A | | 3/2000 | Yamane |
| 6,110,676 A | | 8/2000 | Coull et al. |
| 6,130,044 A | | 10/2000 | Bensimon et al. |
| 6,136,962 A | | 10/2000 | Shi et al. |
| 6,180,351 B1 | | 1/2001 | Cattel |
| 6,284,461 B1 | | 9/2001 | Zlokarnik et al. |
| 6,312,906 B1 | | 11/2001 | Cass et al. |
| 6,428,957 B1 | | 8/2002 | Delenstarr |
| 6,596,490 B1 | * | 7/2003 | Dattagupta ............... 435/6 |
| 2002/0051973 A1 | * | 5/2002 | Delenstarr et al. ........ 435/6 |
| 2002/0068293 A1 | * | 6/2002 | Delenstarr et al. ........ 435/6 |

FOREIGN PATENT DOCUMENTS

WO    WO03/020902    3/2003

OTHER PUBLICATIONS

European Search Report dated: Dec. 5, 2003.

* cited by examiner

*Primary Examiner*—B J Forman
(74) *Attorney, Agent, or Firm*—Timothy H. Joyce

(57) ABSTRACT

The invention provides an apparatus and method for determining a signal produced by a micro array device. The apparatus provides an unstructured probe and structured probe. The unstructured probe binds to a target and provides a first signal that can be compared to a second signal produced by a structured probe. A more accurate level of intensity of the first signal can be determined by comparing to the second signal produced by the structured probe. A method for determining a more accurate level of signal intensity produced from the unstructured probes bound to the target is also disclosed.

15 Claims, 8 Drawing Sheets

MICRO ARRAYS WITH STRUCTURED AND UNSTRUCTURED PROBES

FIELD OF THE INVENTION

The present invention relates to the field of nucleic acids and more particularly toward structured probes for use with micro array devices.

BACKGROUND OF THE INVENTION

Various arrays of polynucleotides (such as RNA and DNA) are known and used in genetic testing, screening and diagnostics. Arrays are defined by the regions of different biopolymers or nucleotides arranged in a predetermined configuration on a substrate. Most importantly, the arrays when exposed to a population of analytes will exhibit a pattern indicative of the presence of the various components separated spatially. Array binding patterns of polynucleotides and/or peptides can be detected by using a variety of suitable target labels. Once bound to the array, these target labels can then be quantified and observed and the overall pattern on the array determined.

A number of methods have been designed for manufacturing micro arrays. DNA micro arrays are particularly useful for analyzing large sets of genes through "gene expression profiling". Using various techniques, arrays can be used to effectively analyze genomes and portions of genomes. Probe arrays have been produced by a variety of means. However, two major methods exist for fabricating arrays used in expression profiling. The first technique uses chemical methods to synthesize polynucleotide probes in situ on array surfaces. This technique uses addressable adaptions of phosphoramidite chemistry. In the second method, polynucleotide probes synthesized enzymatically or chemically can be deposited and attached to a surface through covalent or non-covalent means. The enzymatic method is particularly effective in fabricating arrays with larger probes of (100–1000 nucleotides).

A number of steps are used in the fabrication of the micro arrays designed in the in situ process. The first step in the in situ process is to deposit a polymeric layer on top of a glass substrate or similar type material. Once the polymeric layer has been deposited phosphoramidite chemistry is used to build the oligonucleotides on the micro arrays in a step-wise fashion. This is accomplished by adding one monomer at a time until the final polynucleotide is constructed. The steps of construction using these methodologies are well known in the art and generally include a coupling step followed by a series of optionally capping, oxidation and deblocking steps. The final constructed oligonucleotide can then be employed for binding targets of known or unknown sequences.

Other methods are known in the art that can also be used for fabricating micro arrays. For instance, oligonucleotides or oligonucleotide fragments have been deposited directly on polymer surfaces. After the deposition process the deposited oligonucleotides are then subjected to a drying step and a final curing step. The curing step includes the application of heat, UV light or other similar physical or chemical methods to cross-link the polynucleotides to the surface. Processes have also been designed in which cDNA is used in place of polynucleotides and their fragments.

The above methods have been employed for constructing micro arrays in various sizes and designs. The utilization process, however, provides a number of problems (i.e hybridization) related to reading the signals that are produced from the probes on the array surface. The utilization process provides a variety of potential contaminants that may provide non-specific binding of molecules that could affect the overall final readings or signals produced from the arrays. For instance, a number of dyes and blocking or staining agents are used in the hybridization process. Some of the dyes or agents may or may not be attached to the target sample to be analyzed, and may provide for a source of contamination by sticking to the probes or substrate surfaces. It is not clear what the source of these contaminants might be. However, it is likely that the binding mechanism to the probes and surfaces for these contaminants might be by Van der Waals interactions and hydrogen bonding. Also, it is know that these contaminants not only interfere or effect the final fluorescence signal produced by the probe bound to the target, but also the background signal inside the feature areas.

A number of techniques have been developed to deal with this issue of background noise and contamination. Threshold levels can be set so that only higher signals can be read by a scanner or detector and the probe to target binding determined. Other techniques include using areas of low fluorescence, typically outside of the feature locations to use a calibration point for background determinations. This technique requires one to assume that the areas of lowest fluorescence represent areas of non-bound probe to target. Areas with highest fluorescence or signal are due to the probe to target molecules that contain a fluorescent tag. The most important problem with this technique is that these areas may have been bound or affected by a fluorescent contaminant or some other stray contaminant that interferes with the fluorescent signal that is produced. It would be desirable, therefore, to have a way for determining accurate background signal so that the actual signal produced from a probe/target molecules can be determined.

These and other problems with the prior art processes and designs are obviated by the present invention. The references cited in this application infra and supra, are hereby incorporated in this application by reference. However, cited references or art are not admitted to be prior art to this application.

SUMMARY OF THE INVENTION

The invention provides a micro array for binding a target molecule. The micro array comprises a substrate surface, an unstructured probe attached to the substrate surface for binding to a target and providing a first signal, a structured probe attached to the substrate surface for providing a second signal, and a light source for providing excitation of the structured and unstructured probes wherein the unstructured probes bind to the target and provides the first signal and the structured probe provides the second signal and wherein the first signal produced by the unstructured probe can be compared to the second signal produced by the structured probe and a more accurate first signal can be determined.

The invention also provides a method for determining a first signal produced by an unstructured probe bound to a target on a micro array. The method comprises illuminating an unstructured probe on a micro array to produce a first signal, illuminating a structured probe attached to a micro array to produce a second signal, and comparing the first signal produced from the unstructured probe to the second signal produced from the structured probe to determine a more accurate first signal. The invention provides both uniformity across an array and decreased background noise.

BRIEF DESCRIPTION OF THE DRAWINGS

Embodiments of the invention will now be described with reference to the drawings in which.

DETAILED DESCRIPTION OF THE INVENTION

Figure 1:
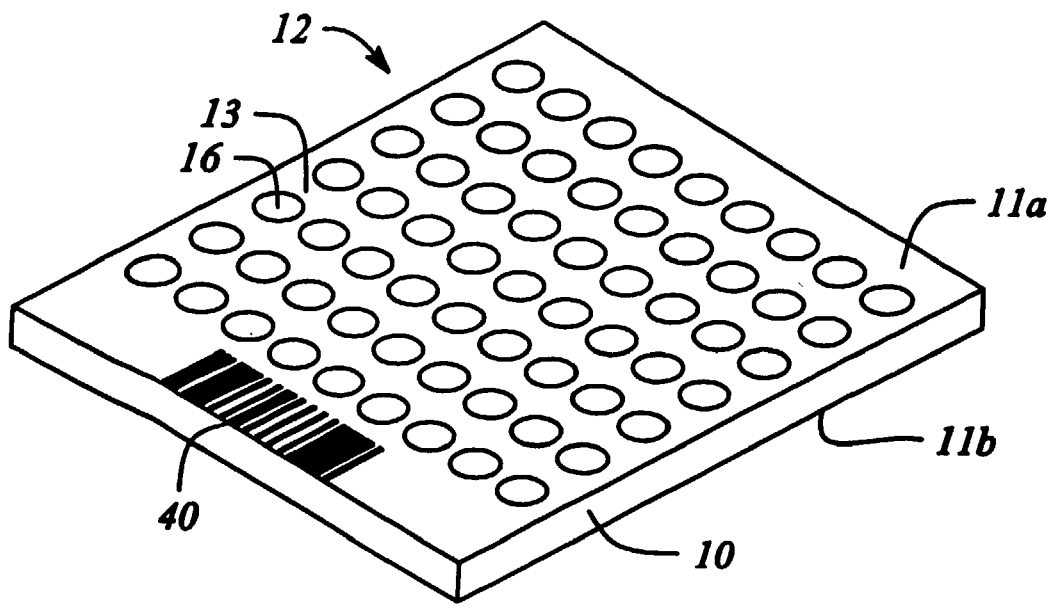
FIG. 1 illustrates a single nucleotide polymorphic array.

Before describing the present invention in detail, it is to be understood that this invention is not limited to specific compositions, process steps, or equipment, as such may vary. It is also to be understood that the terminology used herein is for the purpose of describing particular embodiments only, and is not intended to be limiting. Methods recited herein may be carried out in any order of the recited events that is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

Unless defined otherwise below, all technical and scientific terms used herein have the same meaning as commonly understood by one of ordinary skill in the art to which this invention belongs. Still, certain elements are defined herein for the sake of clarity.

It must be noted that, as used in this specification and the appended claims, the singular forms "a", "an" and "the" include plural referents unless the context clearly dictates otherwise. Thus, for example, reference to "an array" includes more than one array, reference to "a polynucleotide" includes a plurality of polynucleotides and the like.

In describing and claiming the present invention, the following terminology will be used in accordance with the definitions set out below.

An "array", "micro array" or "micro array device" refers to any two-dimensional or substantially two-dimensional arrangement of addressable regions bearing a particular chemical moiety or moieties (e.g., biopolymers such as polynucleotide sequences (nucleic acids), polypeptides (e.g., proteins), etc.) associated with that region. In the broadest sense, the preferred arrays are arrays of polymeric binding agents, where the polymeric binding agents may be any of: polypeptides, proteins, nucleic acids, polysaccharides, synthetic mimetics of such biopolymeric binding agents, etc. In many embodiments of interest, the arrays are arrays of nucleic acids, including oligonucleotides, polynucleotides, cDNAs, mRNAs, synthetic mimetics thereof, and the like. Where the arrays are arrays of nucleic acids, the nucleic acids may be covalently attached to the arrays at any point along the nucleic acid chain, but are generally attached at one of their termini (e.g. the 3' or 5' terminus). Sometimes, the arrays are arrays of polypeptides, e.g., proteins or fragments thereof.

An array is "addressable" when it has multiple regions of different moieties (e.g., different polynucleotide sequences) such that a region (i.e., a "feature" or "spot" of the array) at a particular predetermined location (i.e., an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probe" may be the one that is to be evaluated by the other (thus, either one could be an unknown mixture of polynucleotides to be evaluated by binding with the other). An "array layout" refers to one or more characteristics of the features, such as feature positioning on the substrate, one or more feature dimensions, and an indication of a moiety at a given location. "Hybridizing" and "binding", with respect to polynucleotides, are used interchangeably.

The term "background" or "background noise" refers to the signal provided by buffers, instrument calibration, instrumental error etc., or other sources that are separate and distinct from the signal of interest. "Background noise" is often at the threshold levels of the instrument and can provide random and non-predictable signals that are not indicative of any significant instrument measurement.

A "biopolymer" is a polymer of one or more types of repeating units. Biopolymers are typically found in biological systems and particularly include polysaccharides (such as carbohydrates), peptides (which term is used to include polypeptides and proteins) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in hydrogen bonding interactions, such as Watson-Crick type, Wobble type and the like. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. Biopolymers include DNA (including cDNA), RNA, oligonucleotides, and PNA and other polynucleotides as described in U.S. Pat. No. 5,948,902 and references cited therein (all of which are also incorporated herein by reference), regardless of the source. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (e.g., a single amino acid or nucleotide with two linking groups one or both of which may have removable protecting groups).

"Hybridizing", "annealing" and "binding", with respect to polynucleotides, are used interchangeably. "Binding efficiency" refers to the productivity of a binding reaction, measured as either the absolute or relative yield of binding product formed under a given set of conditions in a given amount of time. "Hybridization efficiency" is a particular sub-class of binding efficiency, and refers to binding efficiency in the case where the binding components are polynucleotides. It will also be appreciated that throughout the present application, that words such as "upper", "lower" are used in a relative sense only. A "set" may have one type of member or multiple different types. "Fluid" is used herein to reference to a liquid.

A "nucleotide" refers to a sub-unit of a nucleic acid and has a phosphate group, a 5-carbon sugar and a nitrogen containing base, as well as analogs of such sub-units. An "oligonucleotide" generally refers to a nucleotide multimer of about 10 to 100 nucleotides in length, while a "polynucleotide" includes a nucleotide multimer having any number of nucleotides.

A "probe" or "micro array probe" refers to a biopolymer such as a nucleic acid, nucleotide, nucleoside or their analogs. The term shall also include nucleotides having modified sugars as well as organic and inorganic leaving groups attached to the purine or pyrimidine rings. For purposes of this application a "probe" may or may not include the use of an optional "stilt".

A "remote location," refers to a location other than the location at which the array is present and hybridization occurs. For example, a remote location could be another location (e.g., office, lab, etc.) in the same city, another location in a different city, another location in a different state, another location in a different country, etc. As such, when one item is indicated as being "remote" from another, what is meant is that the two items are at least in different rooms or different buildings, and may be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data.

A "substrate surface" or "first substrate surface" are synonymous and refer to the surface or material that a probe may be attached or constructed.

A "structured probe" refers to a biomolecule that may fold back on itself, self anneal etc. and is incapable of binding a target. Structured probes may include and not be limited to hairpin, stem-loops, bulges, pseudo-knots, triplexes, quadruplexes, tRNA, hammer head ribozymes etc. The luminescence signal emitted by the "structured probe" emits at a relative intensity that is indicative of the background noise present on the micro array device. The unstructured contains a fluorescent molecule that may fluoresce when it is excited by a light source. The structured probe emits a second signal after it has been excited, and before it returns to ground state.

An "unstructured probe" refers to a biomolecule that is capable of binding a target or some other specified compound. The unstructured probe bound to the target molecule emits a first signal. The probe or target may contain a fluorescent tag that can be used to emit the first signal after the molecule has been excited by a light source and before it returns to ground state.

A "target" refers to a biopolymer such as a nucleotide, nucleoside or their analogs. The term shall also include nucleotides having modified sugars as well as organic and inorganic leaving groups attached to the purine or pyrimidine rings.

Figure 2:
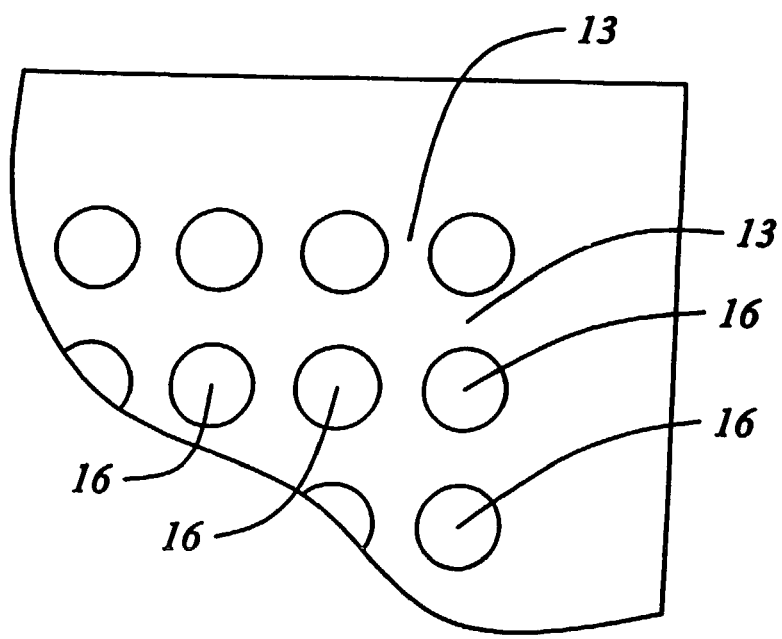
FIG. 2 is an enlarged view of a portion of FIG. 1 showing multiple spots or regions of one array.
Figure 3:
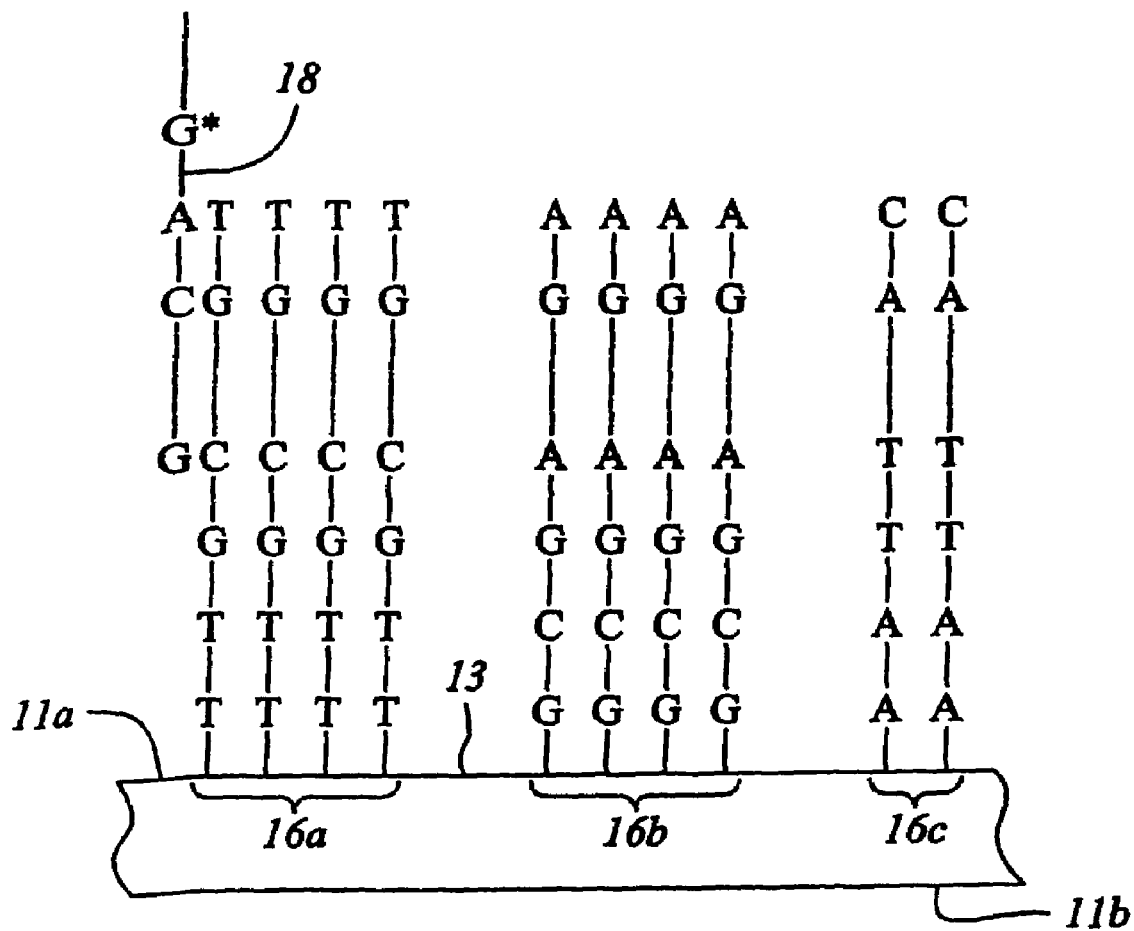
FIG. 3 shows an enlarged view of a portion of FIG. 1 showing the design of the micro array polymeric strands.

Referring now to the figures, FIGS. 1–3 show a micro array 12 in the form of a contiguous, substantially planar substrate 10 that carries multiple features 16 disposed across a first substrate surface 11a of substrate 10 separated by inter feature areas 13. The substrate may be made of transparent material to facilitate data acquisition scanning there through. The features 16 are shown disposed in a pattern that defines the array. The extent of the pattern defines a scan region (not labeled in the figures). A second substrate surface 11b does not carry any features.

A typical array usually includes at least two distinct polymers that differ by monomeric sequences immobilized on (i.e., covalently or non-covalently attached to) different and known locations on the substrate surface 11a, where a space between each location or feature may or may not be present. Each distinct polymeric sequence of the array is typically present as a composition of multiple copies of the polymer on the substrate surface 11a (e.g. as a spot or feature 16 on the surface of the substrate). The number of distinct polymeric sequences, and hence the features 16, present on the slide or substrate may vary, but is generally at least 10, where the number may be as high as at least 50, 100, 500, 1000 or 10,000. The density of features present on the array surface may vary, but will generally be at least about 10 and usually at least about 100 spots/cm$^2$, where the density may be as high as $10^6$ or higher, but will generally not exceed about $10^5$ spots/cm$^2$.

While all of the features 16 may be of different composition, some could be the same (e.g., when any repeats of each feature composition are excluded the remaining features may account for at least 5%, 10%, or 20% of the total number of features). In any event, each feature carries probes in the form of a moiety or mixture of moieties, which in the case of each feature 16 in FIGS. 1–3 is preferably a polynucleotide having a particular sequence, while the inter feature areas 13 do not carry any moieties of a type the same as the features 16 (i.e., no polynucleotides in the case of the features 16 carrying polynucleotides).

Such an array configuration is illustrated schematically in FIG. 3 where the features 16 are shown as carrying different polynucleotide sequences. The features 16 may have widths (that is, diameter, for a round spot) of at least 5 or 10 μm, and usually less than 1.0 cm. In embodiments where very small spot sizes or feature sizes are desired, each of the features 16 may have widths of at least 1.0 μm and less than 1.0 mm, usually less than 500 μm, and more usually less than 200 μm. Features that are not round may have areas equivalent to the area ranges of round features 16 resulting from the foregoing diameter ranges. The probes of the features 16 are typically linked to the substrate 10 through a suitable linker (not shown).

The micro array 12 may cover an area of less than 100 cm$^2$, or even less than 50, 10 or 1 cm$^2$. In many embodiments, the substrate 10 will be shaped generally as a rectangular solid (although other shapes are possible), having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm. It is often desirable to lay down features as close to the edge of the substrate as possible so as to maximize the number of different probes that may be displayed on a given surface area.

A micro array identifier 40 in the form of a bar code in FIG. 1, is associated with the micro array 12, by being provided on the same substrate 10 adjacent to one of the micro arrays 12. In the case where more than one micro array 12 is present on the same substrate 10, a separate identifier can be provided adjacent to each corresponding micro array 12 if desired. The identifier 40 may either contain information on the layout of the micro array 12 or be linkable to a file containing such information in a manner such as described in U.S. Pat. No. 6,180,351. Each identifier 40 for different arrays may be unique so that a given identifier will likely only correspond to one micro array 12 or to a plurality of the micro arrays 12 on the substrate 10. This configuration can be accomplished by making the identifier 40 sufficiently long and incrementing or otherwise varying it for different micro arrays 12 on the substrate 10, or even by selecting it to be globally unique in a manner in which globally unique identifiers are selected as described in U.S. Pat. No. 6,180,351.

Micro arrays 12 such as those of FIGS. 1–3 can be fabricated using drop deposition from pulse-jets of either polynucleotide precursor units (such as monomers) in the case of in situ fabrication, or a previously obtained polynucleotide. Such methods are described in detail in, for example, the previously cited references including U.S. Pat. Nos. 6,242,266, 6,232,072, 6,180,351, 6,171,797, 6,323,043, U.S. patent application Ser. No. 09/302,898 filed Apr. 30, 1999 by Caren, et al., and the references cited therein. Other drop deposition methods can be used for fabrication, as well. Also, instead of drop deposition methods, other array fabrication method may be used including pin spotting and the techniques described in U.S. Pat. Nos. 5,599,695, 5,753,788, and 6,329,143.

The inter-feature areas 13 need not be present particularly when the arrays are made by light directed methods as described in those patents. In use, a feature can detect a target 18 by hybridizing to it, such as target 18 being detected by a feature 16a in FIG. 3 (16b and 16c show other sequenced features) (the "*" on target 18 indicates a label such as a fluorescent label). Use of arrays to detect particular moieties in a sample (such as target sequences) are well known. The layer thickness of the probes 4 at the features 16, together with any detected target 18 to which they are bound, is often less than 500 nm thick, and often less than 200, 100, 50 or 20 nm in thickness.

The first substrate surface 11a of the substrate 10 may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated).

Biopolymer arrays can be fabricated by depositing previously obtained biopolymers (such as from synthesis or natural sources) onto a substrate, or by in situ synthesis methods. Methods of depositing obtained biopolymers include loading then touching a pin or capillary to a surface, such as described in U.S. Pat. No. 5,807,522 or deposition by firing from a pulse jet such as an inkjet head, such as described in PCT publications WO 95/25116 and WO 98/41531, and elsewhere. Such a deposition method can be regarded as forming each feature by one cycle of attachment (that is, there is only one cycle at each feature during which the previously obtained biopolymer is attached to the substrate). For in situ fabrication methods, multiple different reagent droplets are deposited by pulse jet or other means at a given target location in order to form the final feature (hence a probe of the feature is synthesized on the array substrate). The in situ fabrication methods include those described in U.S. Pat. No. 5,449,754 for synthesizing peptide arrays, and in U.S. Pat. No. 6,180,351 and WO 98/41531 and the references cited therein for polynucleotides, and may also use pulse jets for depositing reagents. The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence can be considered as multiple ones of the following attachment cycle at each feature to be formed: (a) coupling an activated selected nucleoside (a monomeric unit) through a phosphite linkage to a functionalized support in the first iteration, or a nucleoside bound to the substrate (i.e. the nucleoside-modified substrate) in subsequent iterations; (b) optionally, blocking unreacted hydroxyl groups on the substrate bound nucleoside (sometimes referenced as "capping"); (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The coupling can be performed by depositing drops of an activator and phosphoramidite at the specific desired feature locations for the array. A final deprotection step is provided in which nitrogenous bases and phosphate group are simultaneously deprotected by treatment with ammonium hydroxide and/or methylamine under known conditions. Capping, oxidation and deprotection can be accomplished by treating the entire substrate ("flooding") with a layer of the appropriate reagent. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in another flooding procedure in a known manner. Conventionally, a single pulse jet or other dispenser is assigned to deposit a single monomeric unit.

The foregoing chemistry of the synthesis of polynucleotides is described in detail, for example, in Caruthers, *Science* 230: 281–285, 1985; Itakura et al., *Ann. Rev. Bio-* chem. 53: 323–356; Hunkapillar et al., Nature 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. No. 4,458,066, U.S. Pat. No. 4,500,707, U.S. Pat. No. 5,153,319, U.S. Pat. No. 5,869,643, EP 0294196, and elsewhere. The phosphoramidite and phosphite triester approaches are most broadly used, but other approaches include the phosphodiester approach, the phosphotriester approach and the H-phosphonate approach. The substrates are typically functionalized to bond to the first deposited monomer. Suitable techniques for functionalizing substrates with such linking moieties are described, for example, in Southern, E. M., Maskos, U. and Elder, J. K., Genomics, 13, 1007–1017, 1992. In the case of array fabrication, different monomers and activator may be deposited at different addresses on the substrate during any one cycle so that the different features of the completed array will have different desired biopolymer sequences. One or more intermediate further steps may be required in each cycle, such as the conventional oxidation, capping and washing steps in the case of in situ fabrication of polynucleotide arrays (again, these steps may be performed in flooding procedure).

Further details of fabricating biopolymer arrays by depositing either previously obtained biopolymers or by the in situ method are disclosed in U.S. Pat. Nos. 6,242,266, 6,232,072, 6,180,351, and 6,171,797. In fabricating arrays by depositing previously obtained biopolymers or by the in situ method, typically each region on the substrate surface on which an array will be or has been formed ("array regions") is completely exposed to one or more reagents. For example, in either method the array regions will often be exposed to one or more reagents to form a suitable layer on the surface that binds to both the substrate and biopolymer or biomonomer. In in situ fabrication the array regions will also typically be exposed to the oxidizing, deblocking, and optional capping reagents. Similarly, particularly in fabrication by depositing previously obtained biopolymers, it may be desirable to expose the array regions to a suitable blocking reagent to block locations on the surface at which there are no features from non-specifically binding to target.

Figure 4:
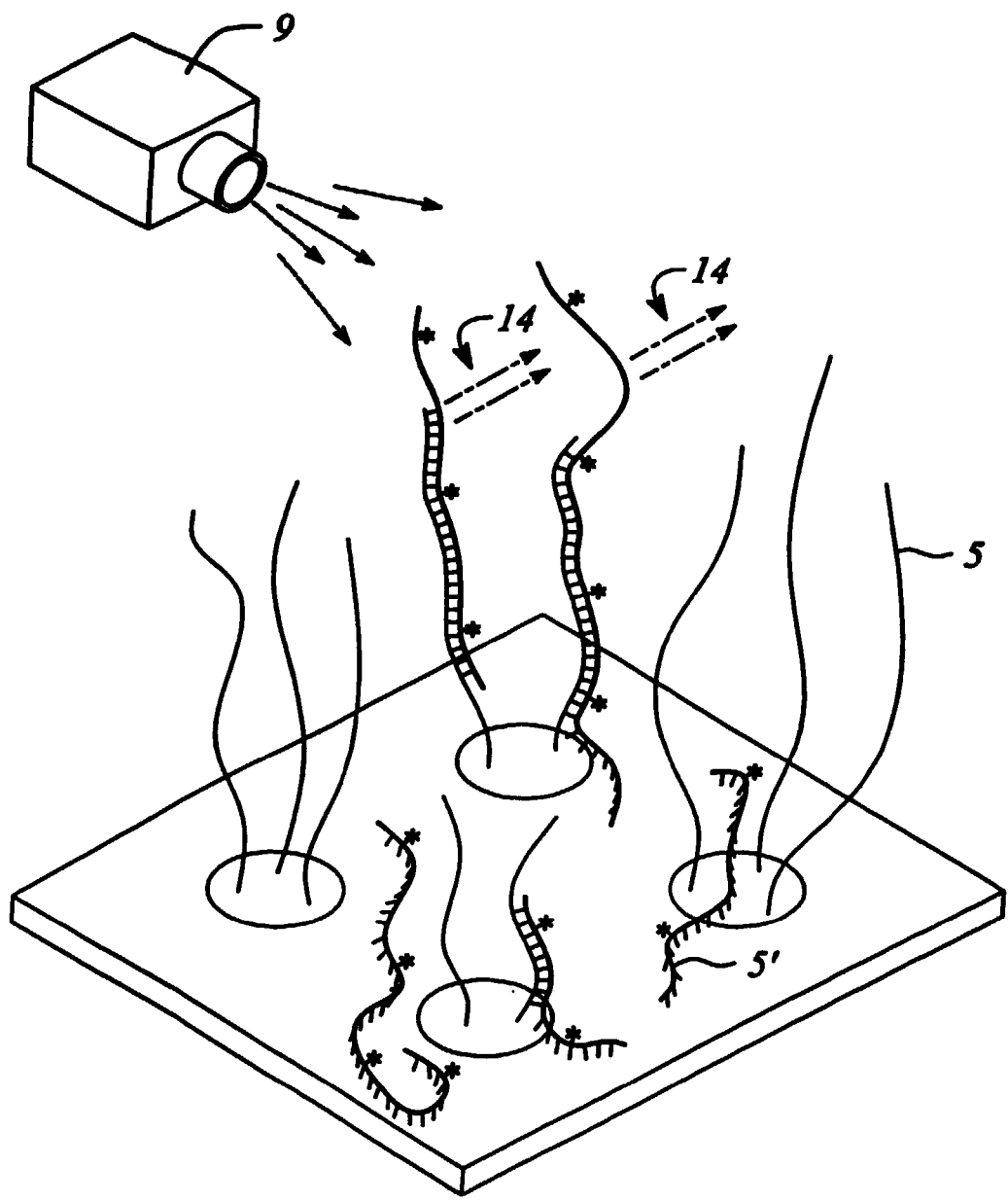
FIG. 4 shows a schematic representation showing unstructured probes magnified on a micro array substrate surface.
Figure 5:
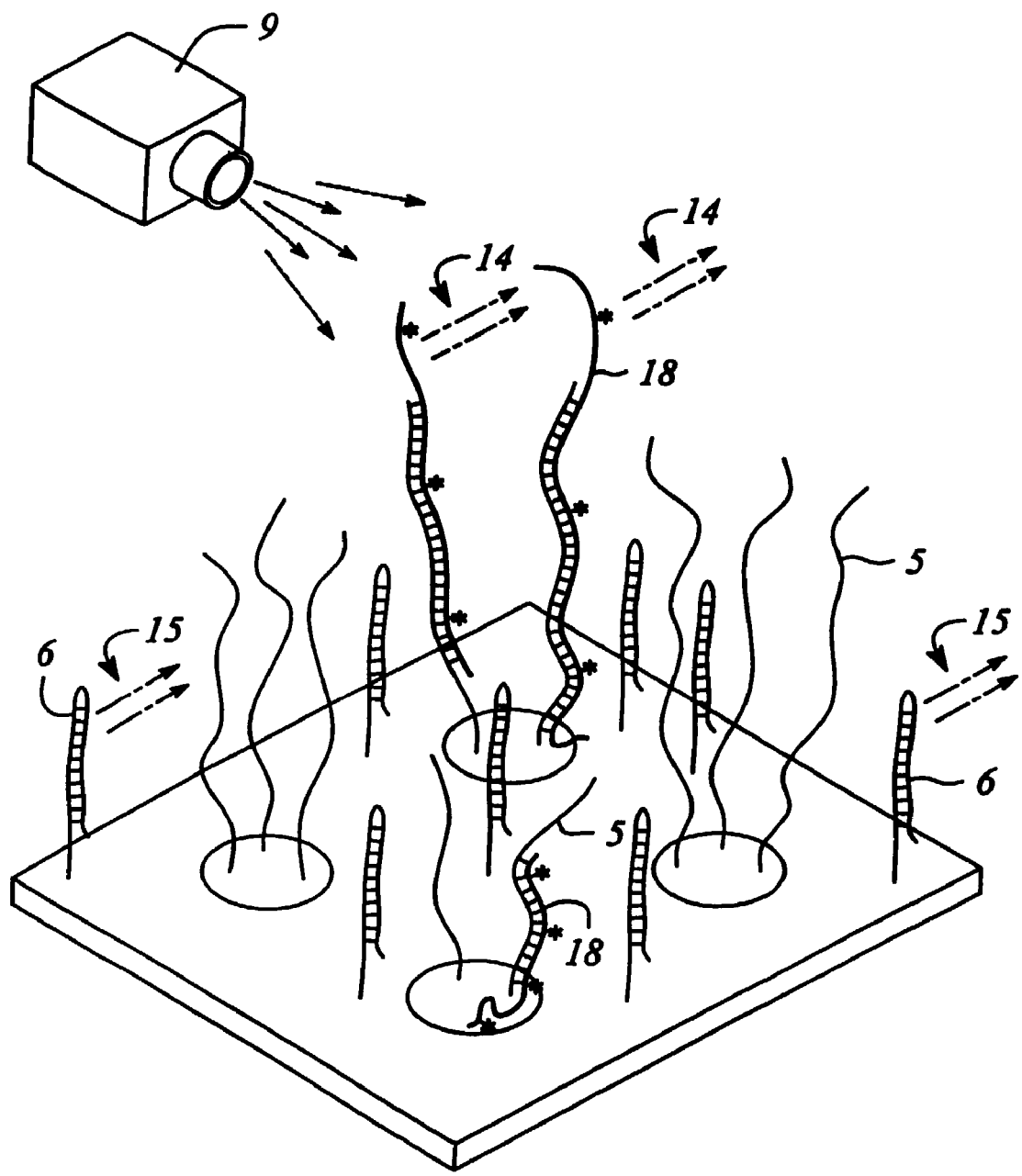
FIG. 5 shows a similar schematic representation as shown in FIG. 4, but with structured probes added to the micro array substrate surface.
Figure 6:
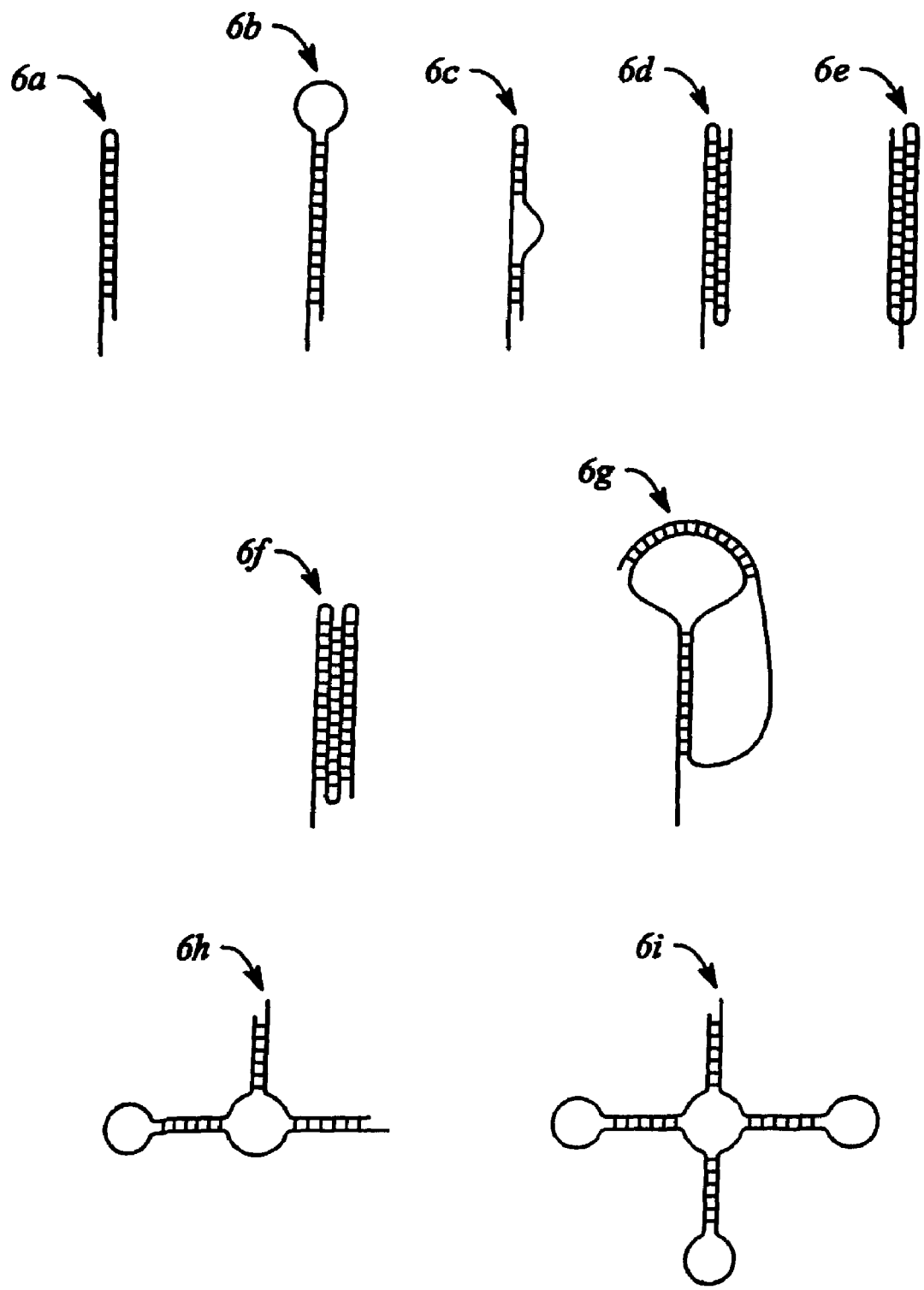
FIG. 6 shows various types of structured probes that can be used with the present invention.

FIG. 4 shows a schematic representation of the micro array 12 with various targets 18 bound to the probes 4 of the substrate surface 11a. The probes 4 may comprise unstructured probes 5 or structured probes 6 (the structured probes 6 are shown in FIGS. 5–6). The target 18 binds to the unstructured probes 5 and not the structured probes 6 (See FIG. 5). The target 18 may bind to the substrate surface 11a of the micro array 12 and cause background noise problems as well as other effects on signal intensity readings taken from the target 18 bound to the unstructured probes 5 (See FIG. 4). Either all or a portion of target 18 may bind to the substrate surface 11a and cause effects on the signal intensity of the first signal 14 (See FIG. 4).

FIG. 5 shows a schematic diagram with both the unstructured probes 5 and the structured probes 6 attached to the substrate surface 11a. When the structured probes 6 are employed, target 18 does not bind to the substrate surface 11a. FIG. 5 shows the structured probes 6 in one embodiment of the invention, a hairpin. The structured probes 6 may be selected from the group consisting of hairpins, bulges, stem-loops, tRNA type structures, hammer head ribozyme type structures, pseudo knots, triplexes and quadriplexes. The invention should not be interpreted to be limited to just these structures and the structures that are shown in the drawings (See FIG. 6 for some structured probe types). A number of different structured probes 6 may be used on the substrate surface 11a. Furthermore, although the diagram shows the existence of both the unstructured probes 5 and the structured probes 6 on the substrate surface 11a, other embodiments of the present invention may be possible. For instance, it is within the scope of the invention that the unstructured probes 5 and/or the structured probes 6 be used separately. For instance, the unstructured probes 5 could be used on a substrate surface 11a to measure the intensity of the first signal 14. The structured probes 6 could then be used on the same or a second substrate surface (11b or another array surface) to determine the intensity of the second signal 15. The intensity of the first signal 14 can then be compared to the intensity of the second signal 15 and a more accurate intensity of the first signal 14 can be determined. This is generally accomplished by subtracting the intensity of the second signal 14 that represents background noise or absorption caused by the structured probes 6.

The structured probes 6 may comprise a variety of molecules having various sizes, shapes and conformations. For instance, the structured probes 6 may be selected from the group consisting of peptides, oligonucleotides, proteins, polysaccharides, amino acids, carbohydrates, and nucleotides. It is important to the invention that the structured probes 6 be designed in such a way that they are not capable of binding to the target 18 like the unstructured probes 5. The structured probes 6 may be designed to have various primary, secondary, tertiary or even quartenary structures that prevent binding to the target 18 (See FIG. 6). For instance, the structured probes 6 can be designed to comprise 100 mers or less with the sequence (GT)n(AC)n. This type of primary oligonucleotide sequence allows for self annealing or folding of the structured probes 6. The structured probes 6 are allowed to fold back on themselves and, therefore, are not capable of binding the target 18. Other sequences known in the art which allow for folding or stable structures at 65 degrees Celsius may be used with the present invention. Typical complexes might include sequences that form hairpins, pseudo knots, triplexes and quadriplexes. The structure probes of the present invention provide for uniformity of noise across the array as well as reduction in background noise.

The light source 9 of the present invention (See FIG. 4) may comprise a variety of devices that are well known in the art. For instance, the light source 9 might be a laser, fluorometer, luminescence spectrometer, laser or similar type of light source device. In addition, the light source 9 may provide fluorescence, phosphorescence, luminescence or even bioluminescence light. The light source 9 of the present invention provides a light that interacts with unstructured probes 5 or the structured probes 6. For instance, if the light source 9 is a fluorescence light, the light is applied to the probe 4 and then a signal is produced at a defined intensity. The signal such as the first signal 14 (See FIG. 4) or the second signal 15 (See FIG. 5) are produced by exciting a molecule or tag attached to either or both of the unstructured probes 5 or structured probes 6. First signal 14 and/or second signal 15 are a result of excitation of the probes 4 or a tag or other molecule attached to the probes 4. The signals are produced by emission of light after the molecules or probes have been excited, but before they return to their respective ground states.

The unstructured probes 5 may or may not have an optional luminescence tag (shown as a * in FIG. 3). If the unstructured probe 5 is an oligonucleotide, it will absorb and emit light at a defined wavelength and intensity. The chemistry of the probes 4 need not be limited to nucleotides or oligonucleotides. For instance, if the structured probe 6 is a protein, peptide or other similar molecule with one our more aromatic residues such as tryptophan, tyrosine, or phenylalanine, the emission spectrum will provide a definable and characteristic pattern. Luminescence intensities can then be measured and final luminescence levels determined.

An important component of the present invention is the fact that both the unstructured probes 5 and the structured probes 6 (used to subtract out the background from the signal produced by the unstructured probes) can be placed on the same substrate surface 11a (See FIG. 5). This allows for an accurate method for determining signal intensities produced from the same micro array 12. This technique has significant advantages for scientists that work with luminescent spectrometers. For instance, it is often a problem in fluorescence measurement that readings fluctuate due to intrinsic instrument design (i.e. lamp design, turning the lamp on and off, calibration etc.). Although these discrepancies may be relatively small, they can be cumulative over time and seriously impact final signal readings and intensities. Furthermore, these effects are even more magnified by the fact that signal readings are on a relative scale (readings are based on a relative intensity). Therefore, having a structured probe 6 that can calibrate background noise on the same substrate surface 11a as an unstructured probe 5 provides significant advantages. In addition, measurements can be taken simultaneously that provide for calibration of a more accurate first signal 14. If the structured probe 6 provides a second signal 15 that provides a close approximation of the background noise and the unstructured probe 5 provides a first signal 14 that includes background noise plus the second signal 15, then the first signal 14 for the unstructured probe 5 can be calibrated by subtracting the intensity of structured probe 6 (background noise) from the signal intensity of the structured probe 6 bound to the target 18. The structuring of the substrate surface 11a with the unstructured probe 5 and the structured probes 6 has the effect of eliminating the problems outlined above regarding intrinsic instrumental error and experimental (hybridization) error.

Having described the apparatus of the present invention, a description of the method of the present invention is now in order. The method of the present invention provides a way for determining a more accurate reading of a first signal 14 produced by an unstructured probe 5 bound to a target 18 on a micro array 12. The method comprises illuminating the unstructured probe 5 on the micro array 12 to produce a first signal 14. This is accomplished by a light source 9. The same or a different light source 9 can then or simultaneously be used for illuminating a structured probe 6 on the micro array 12 to produce a second signal 15. The first signal 14 produced from the unstructured probe 5 is then compared to the second signal 15 produced from the structured probe 6 to determine a more accurate reading of the first signal 15 produced from the unstructured probe 5 bound to the target 18.

EXAMPLE 1

Figure 7:
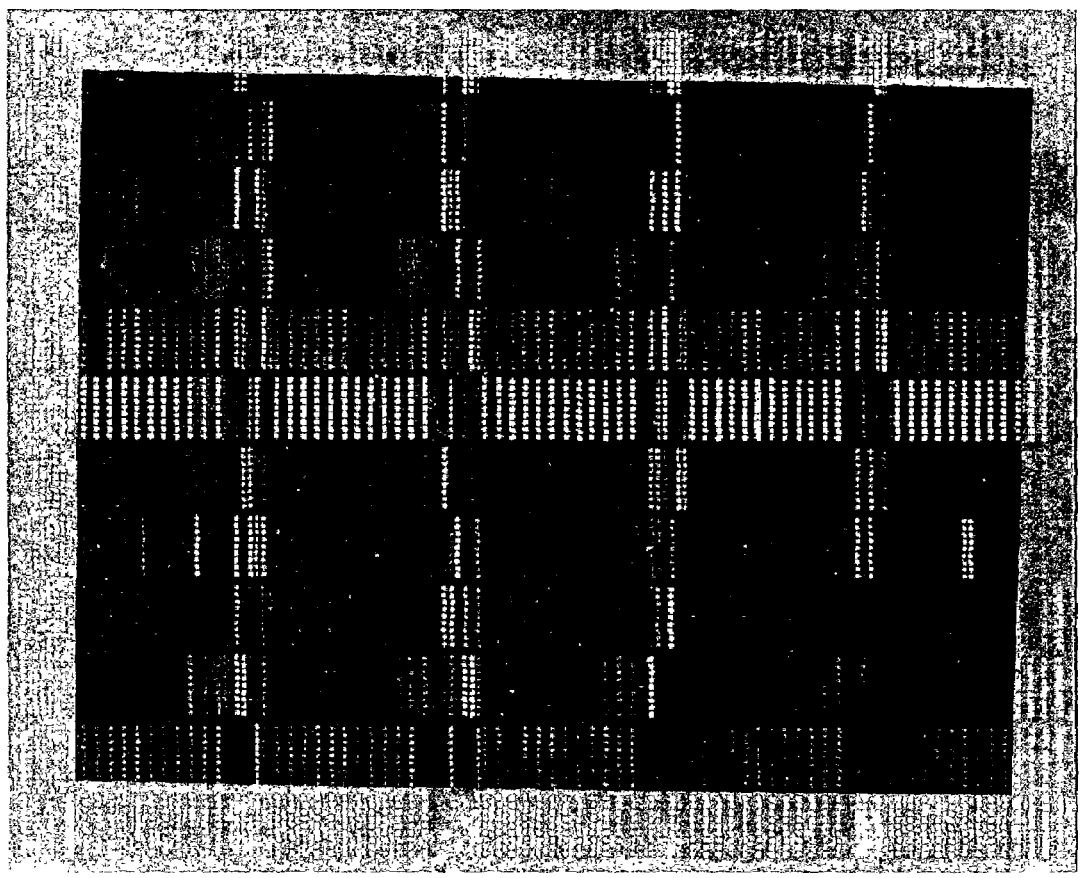
FIG. 7 shows an actual micro array with attached unstructured and structured probes.

FIG. 7 shows a micro array with attached unstructured probes 5 and structured probes 6 to a substrate surface 11a. Micro arrays and samples were prepared according to protocols previously described. The figure shows the high intensity level of the unstructured probes 5 bound to the labeled target 18 (light yellow or green shows strong signal). Areas of no signal are indicative of where the structured probes 6 have been positioned on the substrate surface 11a.

EXAMPLE 2

Figure 8:
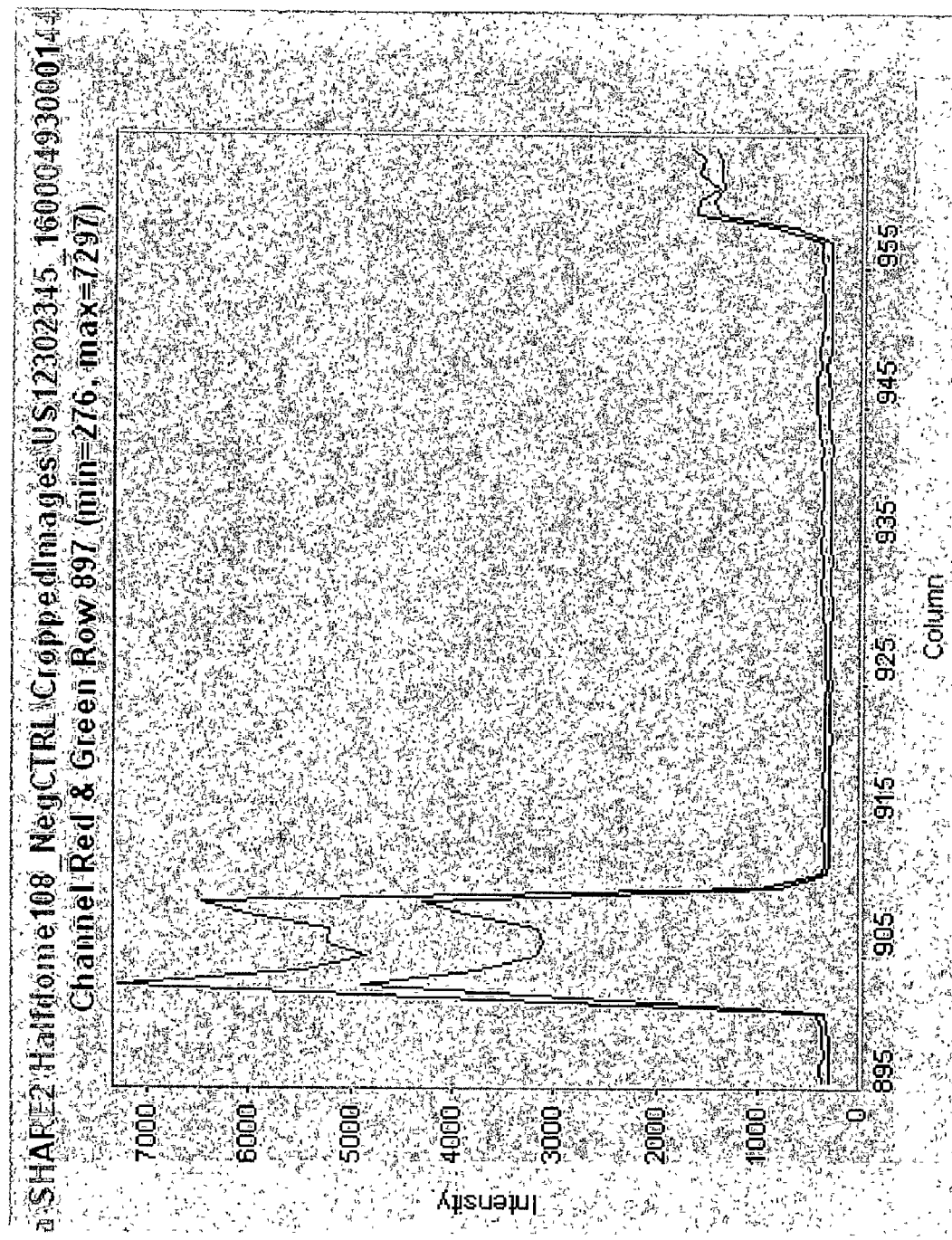
FIG. 8 shows a comparison of the signal intensities produced by various channels across a typical substrate surface.

FIG. 8 shows a comparison of the signal intensities produced by various channels across the substrate surface 11a. In particular, the intensities in both the green and red channels are similar and then drop off at various positions across the array surface where the structured probes 6 have been positioned (roughly channel columns 915–945).

EXAMPLE 3

Figure 9:
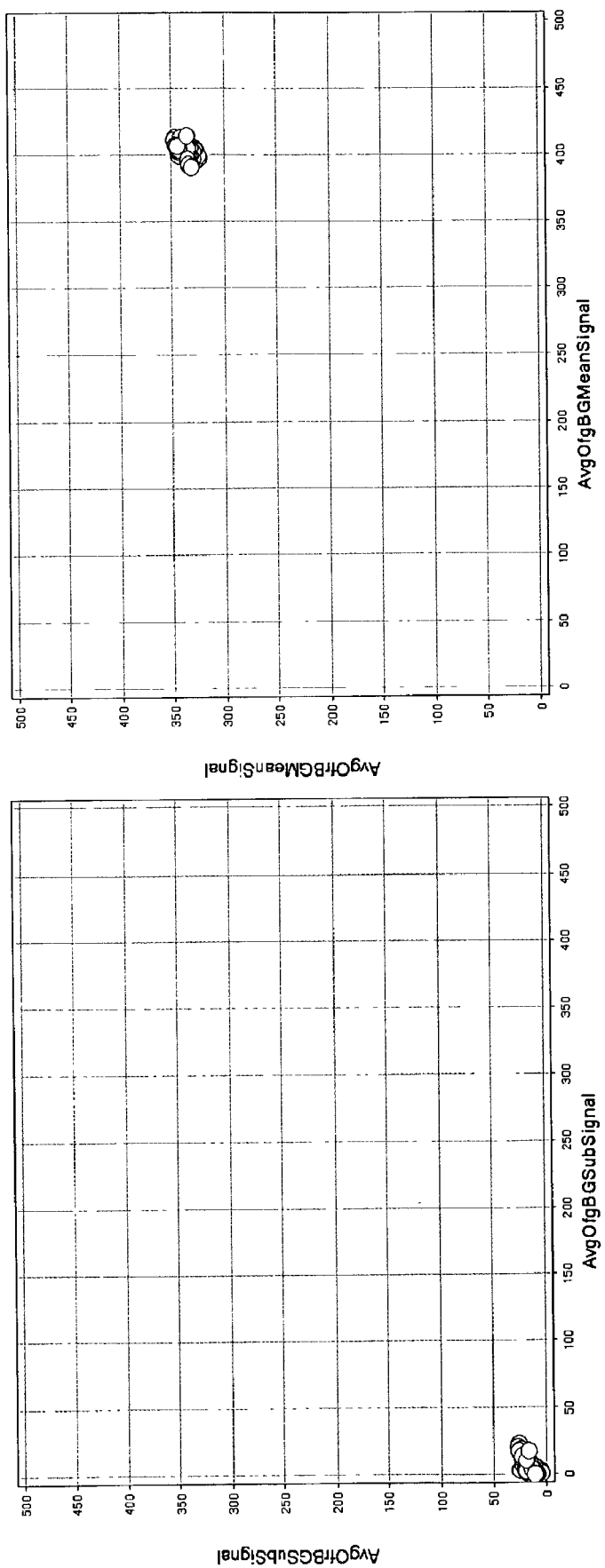
FIG. 9 shows a set of plots comparing negative control probes plotted against background mean signal.

FIG. 9 shows a set of plots comparing performance of GD3 negative control probes plotted against background mean signal (10 array). The graph on the left shows the averaged red vs. green background subtracted signal for the negative control probe GD3 for 10 replicate arrays. The right graph shows that average red and green background mean signals on the same arrays. Comparing the two graphs demonstrates that the negative control probe has a lower background than the average background mean signal for the slide and is better suited to be used for background correction. Each point is the average of 20 probes. Description of the experiment: Human Hela cDNA targets were generated from 20 mg of total RNA by incorporation of cyanine 5 or cyanine 3 using the Agilent Direct Labeling Kit. The cyanine-3 and cyanine-5 targets were mixed and hybridized to each Agilent cDNA microarray for 17 hours at 65 degrees centigrade. The slides were washed, scanned on an Agilent scanner and feature extracted using Agilent's feature extraction software.

We claim:

1. A micro array for binding a target, comprising:
   (a) a substrate surface;
   (b) at least one feature of unstructured probes attached to said substrate surface for binding to said substrate surface for binding to said target and providing a first signal;
   (c) nucleic acid structured probes attached to at least a portion of an interfeature area of said substrate surface in a manner that prevents binding of said target to said interfeature areas of said substrate surface, wherein said structured probes are selected from the group consisting a pseudo knot, stem-loops, bulges, hairpin, t RNA, triplex, and quadriplex and provide a second signal, and
   (d) a light source for providing excitation of said unstructured and structured probes wherein said at least one feature of unstructured probes provides said first signal and said structured probes provides said second signal and wherein said first signal produced by said at least one feature of unstructured probes can be compared to said second signal produced by said structured probes.

2. A micro array as recited in claim 1, wherein said unstructured probe is a biomolecule.

3. A micro array as recited in claim 2, wherein said biomolecule is selected from the group consisting of a protein, an amino acid, an oligonucleotide, a peptide, a nucleotide, a carbohydrate, a polysaccharide, and a lipid.

4. A micro array as recited in claim 1, wherein the unstructured probe is labeled and produces said first signal.

5. A micro array as recited in claim 1, wherein the target is labeled and produces a first signal.

6. A micro array as recited in claim 1, wherein said light source is a luminescent light.

7. A micro array as recited in claim 6, wherein said luminescent source is selected from the group consisting of a fluorescent light, phosphorescent light, and a bioluminescent light.

8. A micro array as recited in claim 1, wherein said structured probe is self annealing.

9. A micro array as recited in claim 1, wherein said structured probe can fold back on itself to prevent annealing with said target.

10. A micro array as recited in claim 1, wherein said target is a biomolecule.

11. A micro array as recited in claim 10, wherein said target is selected from the group consisting of a protein, an amino acid, an oligonucleotide, a peptide, a nucleotide, a carbohydrate, a polysaccharide, and a lipid.

12. A micro array for binding a target, comprising
 (a) a substrate surface;
 (b) at least one feature of nucleic acid unstructured probes attached to said substrate surface for binding to said target and providing a first signal;
 (c) nucleic acid structured probes comprising a nucleic acid that folds back on itself and self anneals attached to at least a portion of an interfeature area of said substrate surface and wherein said nucleic acid structured probes prevent binding of said target to said interfeature areas of said substrate surface and provide a second signal.

13. A micro array system comprising:
 (a) a micro array for binding a target;
  (i) at least one feature of unstructured probes attached to said substrate surface for binding a target and providing a first signal,
  (ii) nucleic acid structured probes comprising a nucleic acid that folds back on itself and self anneals attached to at least a portion of an interfeature area of said substrate surface and wherein the nucleic acid structured probes prevent binding of said target to said interfeature areas of said substrate surface and provide a second signal; and
 (b) a light source for providing excitation to of said unstructured and structured probes.

14. A micro array system as recited in claim 13, wherein said light source is a luminescent light.

15. A micro array system as recited in claim 14, wherein said luminescent source is selected from the group consisting of a fluorescent light, a phosphorescent light, and a bioluminescent light.

* * * * *